United States Patent
Tegethoff et al.

(10) Patent No.: US 11,838,604 B2
(45) Date of Patent: Dec. 5, 2023

(54) GENERATING CROWDSOURCED TRAILERS BASED ON FORWARD OR REWIND COMMANDS

(71) Applicant: ROKU, INC., San Jose, CA (US)

(72) Inventors: Christopher James Tegethoff, Portland, OR (US); Abhijit Pol, Los Gatos, CA (US); Anthony Wood, Palo Alto, CA (US)

(73) Assignee: Roku, Inc., San Jose, CA (US)

( * ) Notice: Subject to any disclaimer, the term of this patent is extended or adjusted under 35 U.S.C. 154(b) by 0 days.

(21) Appl. No.: 17/730,454

(22) Filed: Apr. 27, 2022

(65) Prior Publication Data

US 2022/0256254 A1 Aug. 11, 2022

Related U.S. Application Data

(63) Continuation of application No. 17/189,558, filed on Mar. 2, 2021, now Pat. No. 11,356,750, which is a
(Continued)

(51) Int. Cl.
*H04N 21/8549* (2011.01)
*G06F 3/0482* (2013.01)
(Continued)

(52) U.S. Cl.
CPC ....... *H04N 21/8549* (2013.01); *G06F 3/0482* (2013.01); *H04N 21/4312* (2013.01);
(Continued)

(58) Field of Classification Search
None
See application file for complete search history.

(56) References Cited

U.S. PATENT DOCUMENTS

| D417,220 S | 11/1999 | Godette et al. |
| D433,403 S | 11/2000 | Backs et al. |

(Continued)

FOREIGN PATENT DOCUMENTS

| CN | 302917160 | 8/2014 |
| JP | 2017005490 A | 1/2017 |

(Continued)

OTHER PUBLICATIONS

English language abstract for KR-10-20110100675-A, published Sep. 14, 2011 (downloaded from https://worldwide.espacenet.com), 2 pages.

(Continued)

*Primary Examiner* — Heather R Jones
(74) *Attorney, Agent, or Firm* — Sterne, Kessler, Goldstein & Fox P.L.L.C.

(57) ABSTRACT

Disclosed herein are system, method, and computer program product embodiments for automatically and programmatically generating crowdsource trailers. In an embodiment, interactions with streaming content performed by a plurality users who consumed the content are received. A value is assigned to each of the interactions. A plurality of windows of content are identified within the streaming content. The values of the interactions for each of the landing frames within each of the plurality of windows are accumulated. A particular one of the plurality of windows with a highest accumulated value is selected. A trailer for the content is generated based on the selected particular window and provided.

20 Claims, 14 Drawing Sheets

Related U.S. Application Data continuation of application No. 16/459,730, filed on Jul. 2, 2019, now Pat. No. 10,972,812, which is a continuation of application No. 15/940,386, filed on Mar. 29, 2018, now Pat. No. 10,390,110, which is a continuation-in-part of application No. 15/806,384, filed on Nov. 8, 2017, now Pat. No. 10,531,138.

(51) Int. Cl.
  *H04N 21/472* (2011.01)
  *H04N 21/44* (2011.01)
  *H04N 21/431* (2011.01)
  *H04N 21/442* (2011.01)
  *H04N 21/466* (2011.01)

(52) U.S. Cl.
  CPC ....... *H04N 21/44* (2013.01); *H04N 21/44204* (2013.01); *H04N 21/44222* (2013.01); *H04N 21/4667* (2013.01); *H04N 21/472* (2013.01); *H04N 21/4662* (2013.01)

(56) References Cited

U.S. PATENT DOCUMENTS

| | | | |
|---|---|---|---|
| D543,971 S | 6/2007 | D'Hoore | |
| D559,254 S | 1/2008 | Ashida et al. | |
| D571,790 S | 6/2008 | Yoshitake et al. | |
| D575,285 S | 8/2008 | Ashida et al. | |
| D577,025 S | 9/2008 | Ashida et al. | |
| D601,129 S | 9/2009 | Maruska et al. | |
| D612,839 S | 3/2010 | Kato | |
| D614,604 S | 4/2010 | Hoehn et al. | |
| D628,192 S | 11/2010 | Hsu et al. | |
| D628,986 S | 12/2010 | VanDuyn et al. | |
| D628,988 S | 12/2010 | Yu | |
| D630,189 S | 1/2011 | Daniels et al. | |
| D634,277 S | 3/2011 | Chouji | |
| D644,695 S | 9/2011 | Falc et al. | |
| D647,887 S | 11/2011 | Dawson et al. | |
| D679,680 S | 4/2013 | Wood et al. | |
| D713,820 S | 9/2014 | O'Neil | |
| D714,762 S | 10/2014 | O'Neil | |
| 9,002,175 B1* | 4/2015 | Raj | H04N 5/76 386/241 |
| D763,830 S | 8/2016 | Jones et al. | |
| 9,465,435 B1* | 10/2016 | Zhang | H04N 21/8549 |
| 10,334,326 B2 | 6/2019 | Tegethoff et al. | |
| 10,390,110 B2 | 8/2019 | Tegethoff et al. | |
| 10,531,138 B2 | 1/2020 | Tegethoff et al. | |
| 10,972,812 B2 | 4/2021 | Tegethoff et al. | |
| D938,940 S | 12/2021 | Park et al. | |
| 11,356,750 B2 | 6/2022 | Tegethoff et al. | |
| 2004/0247286 A1 | 12/2004 | Takagi et al. | |
| 2010/0229121 A1* | 9/2010 | Falchuk | H04N 21/252 715/817 |
| 2012/0159329 A1 | 6/2012 | Chow et al. | |
| 2014/0006951 A1 | 1/2014 | Hunter | |
| 2014/0195647 A1 | 7/2014 | Chen et al. | |
| 2014/0282262 A1* | 9/2014 | Gregotski | H04N 21/8549 715/838 |
| 2014/0282661 A1 | 9/2014 | Martin et al. | |
| 2015/0074552 A1 | 3/2015 | Chai et al. | |
| 2015/0235672 A1* | 8/2015 | Cudak | H04N 21/252 386/241 |
| 2016/0014458 A1* | 1/2016 | Robinson | H04N 21/47214 386/241 |
| 2019/0141378 A1 | 5/2019 | Tegethoff et al. | |
| 2019/0141415 A1 | 5/2019 | Tegethoff et al. | |
| 2019/0141416 A1 | 5/2019 | Tegethoff et al. | |
| 2019/0387287 A1 | 12/2019 | Tegethoff et al. | |
| 2021/0185414 A1 | 6/2021 | Tegethoff et al. | |
| 2022/0353588 A1 | 11/2022 | Sookne et al. | |

FOREIGN PATENT DOCUMENTS

| | | |
|---|---|---|
| KR | 10-2011-0100675 A | 9/2011 |
| KR | 10-2015-0039627 A | 4/2015 |
| WO | WO-2016/153326 A1 | 9/2016 |

OTHER PUBLICATIONS

English language abstract for KR-10-2015-0039627-A, published Apr. 13, 2015 (downloaded from https://worldwide.espacenet.com), 1 page.

English language abstract for JP-2017-005490-A, published Jan. 5, 2017 (downloaded from https://worldwide.espacenet.com), 1 page.

International Search Report and Written Opinion of the International Searching Authority dated Feb. 22, 2019 for International Application No. PCT/US2018/059519, 13 pages.

International Preliminary on Patentability directed to related International Application No. PCT/US2018/059519, dated May 12, 2020; 7 pages.

European Search Report directed to related European Application No. 18875133.3, dated Mar. 29. 2021; 11 pages.

Roku 3 review: Roku's speedy streamer is the best box yet, posted Mar. 11, 2013 [online], [retrieved Jan. 5, 2023]. Retrieved from internet, https://www.cnet.com/reviews/roku-3-newer-model-available-review/, (Year: 2013).

Examination Report directed to related European Application No. 18875133.3, dated Jun. 2, 2022; 6 pages.

Examination Report directed to related European Application No. 18875133.3, dated Mar. 13, 2023; 6 pages.

* cited by examiner

GENERATING CROWDSOURCED TRAILERS BASED ON FORWARD OR REWIND COMMANDS

CROSS-REFERENCE TO RELATED APPLICATIONS

This application is a continuation of U.S. patent application Ser. No. 17/189,558 titled "Automatically and Programmatically Generating Crowdsourced Trailers", filed Mar. 2, 2021, which is a continuation of U.S. patent application Ser. No. 16/459,730 titled "Automatically and Programmatically Generating Crowdsourced Trailers", filed Jul. 2, 2019, which is a continuation of U.S. patent application Ser. No. 15/940,386 titled "Automatically and Programmatically Generating Crowdsourced Trailers", filed Mar. 29, 2018, which is a continuation-in-part of U.S. patent application Ser. No. 15/806,384 titled "Automatically And Programmatically Generating Scene Change Markers," filed Nov. 8, 2017; and is related to U.S. patent application Ser. No. 15/806,379 titled "Enhanced Playback Bar," filed Nov. 8, 2017, all of which are herein incorporated by reference in their entireties.

BACKGROUND

Field

This disclosure is generally directed to using learning systems and artificial intelligence to enhance the user's experience when selecting and playing content, such as movies and TV shows.

Background

Roku leads the over-the-top (OTT) market with more viewers streaming movies and TV shows on Roku devices than any other streaming device, including Google Chromecast, Amazon Fire, and Apple TV. Movies dominate the type of video-on-demand (VOD) content viewed across all regions and generations. A 2016 Nielsen report found that "Eighty percent of global respondents who watch on-demand content say they view movies." Roku streams over a billion hours of video per month, a 61 percent increase over 2016. (Bloomberg Technology, May 2017).

Data suggests that the OTT market will continue this positive trend for years to come, but when it comes to media consumption, the industry is in a continual cycle of rapid evolution. Technology that does not continually adapt to the changing needs of consumers may lose a competitive edge. With the transformation from older more traditional forms of consumption, such as the DVD and Blu-Ray to streaming content, one often overlooked feature is the scene change marker.

Streaming video has yet to adopt the idea of the DVD/Blu-ray scene change marker because the user can continue watching wherever they left off and scrub through a timeline of thumbnails. From a technology and implementation perspective, there are barriers in automatically and programmatically generating scene change markers. Scene transitions or chapter breaks to this day are still input manually, so it would be impossible to apply a manual approach to all the movies in an OTT provider's catalog. More importantly, simple automation would not be able to capture the interest level of millions of viewers.

Other often overlooked features are the interfaces through which users navigate to select content for display. There are millions of movies and TV shows available via the over-the-top (OTT) market. Conventional approaches for displaying available content such as scrollable, static image grid views—provide users with only limited help when navigating through an OTT provider's immense catalog of available content to find titles of interest.

SUMMARY

Provided herein are system, apparatus, article of manufacture, tangible computer-readable medium, method and/or computer program product embodiments, and/or combinations and sub-combinations thereof, for using learning systems to improve the preview of content, such as but not limited to movies and TV shows.

In some embodiments, a method is directed to automatically and programmatically generate content trailers. The method operates in a media device that is communicatively coupled to, for example, a display device. The method can operate in other devices, such as but not limited to a smart TV. The display device displays a graphical user interface (GUI) having a plurality of tiles each corresponding to content available for display. The GUI also includes at least one preview display area.

The method operates by receiving interactions with streaming content performed by a plurality users who consumed the content. The interactions are associated with a landing frame of the content. A value is assigned to each of the interactions. A plurality of windows of content are identified within the streaming content. The values of the interactions for each of the landing frames within each of the plurality of windows are accumulated. A particular one of the plurality of windows with a highest accumulated value is selected. A trailer for the content is generated based on the selected particular window, and the content and trailer are provided.

A system including a processor performs operations including receiving interactions with streaming content performed by a plurality users who consumed the content. The interactions are associated with a landing frame of the content. A value is assigned to each of the interactions. A plurality of windows of content are identified within the streaming content. The values of the interactions for each of the landing frames within each of the plurality of windows are accumulated. A particular one of the plurality of windows with a highest accumulated value is selected. A trailer for the content is generated based on the selected particular window, and the content and trailer are provided.

A non-transitory computer-readable medium having instructions stored thereon that, when executed by at least one computing device, causes the at least one computing device to perform operations including receiving interactions with streaming content performed by a plurality users who consumed the content. The interactions are associated with a landing frame of the content. A value is assigned to each of the interactions. A plurality of windows of content are identified within the streaming content. The values of the interactions for each of the landing frames within each of the plurality of windows are accumulated. A particular one of the plurality of windows with a highest accumulated value is selected. A trailer for the content is generated based on the selected particular window, and the content and trailer are provided.

BRIEF DESCRIPTION OF THE FIGURES

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

This disclosure is directed to using learning systems to improve the playback of content, such as but not limited to movies and TV shows. Some embodiments are directed to automatically and programmatically generating scene change markers. Other embodiments are directed to enhancements for generating trailers in a crowdsourced manner. These embodiments are described below.

Introduction

Figure 1:
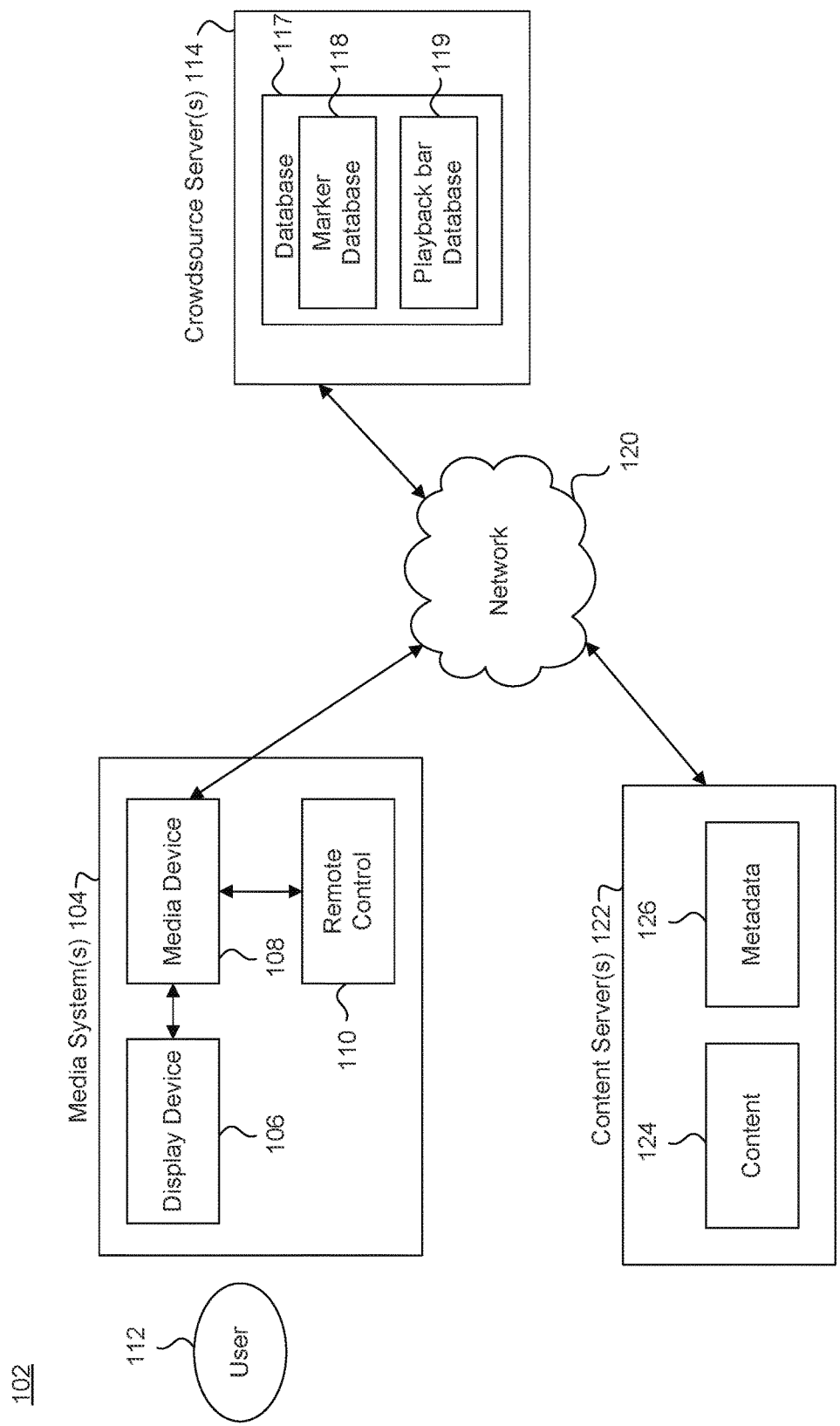
FIG. 1 illustrates a block diagram of a multimedia environment, according to some embodiments.

FIG. 1 illustrates a block diagram of a multimedia environment 102, according to some embodiments. In a non-limiting example, multimedia environment 102 is directed to streaming media. In some embodiments, the terms "media" and "content" are used interchangeably herein.

The multimedia environment 102 may include one or more media systems 104 and one or more content servers 122 communicatively coupled via a network 120. In various embodiments, the network 120 can include, without limitation, wired and/or wireless intranet, extranet, Internet, cellular, Bluetooth, broadcast, satellite, terrestrial, and/or any other short range, long range, local, regional, global communications network, as well as any combination thereof.

Media system 104 may include a display device 106, media device 108 and remote control 110. Display device 106 may be a monitor, television, computer, smart phone, tablet, wearable (such as a watch), and/or projector, to name just a few examples. Media device 108 may be a streaming media device, DVD device, Blu-Ray device, audio/video playback device, cable box, and/or digital video recording device, to name just a few examples. In some embodiments, the media device 108 can be a part of, integrated with, operatively coupled to, and/or connected to display device 106. The media device 108 may be configured to communicate with network 120.

A user 112 may interact with media system 104 via remote control 110. Remote control 110 can be any component, part, apparatus or method for controlling media device 108 and/or display device 106, such as a remote control, a tablet, laptop computer, smartphone, wearable device, on-screen controls, voice responsive controls, integrated control buttons, or any combination thereof, to name just a few examples. An example remote control 110 is illustrated in FIG. 2B.

Content servers 122 (also called content sources) may each include databases to store content 124 and metadata 126. Content 124 may include any combination of music, videos, movies, TV shows, multimedia, images, still pictures, text, graphics, gaming applications, advertisements, software, and/or any other content or data objects in electronic form. In some embodiments, metadata 126 comprises data about content 124. For example, metadata 126 may include associated or ancillary information indicating or related to writer, director, producer, composer, artist, actor, summary, chapters, production, history, year, trailers, alternate versions, related content, applications, and/or any other information pertaining or relating to the content 124. Metadata 126 may also or alternatively include links to any such information pertaining or relating to the content 124. Metadata 126 may also or alternatively include one or more indexes of content 124, such as but not limited to a trick mode index.

The multimedia environment 102 may also include one or more crowdsource servers 114. In some embodiments, crowdsource servers 114 each include one or more databases 117. Databases may include a marker database 118 and/or a playback bar database 119. The crowdsource servers 114 may be configured to communicate with network 120.

Figure 2A:
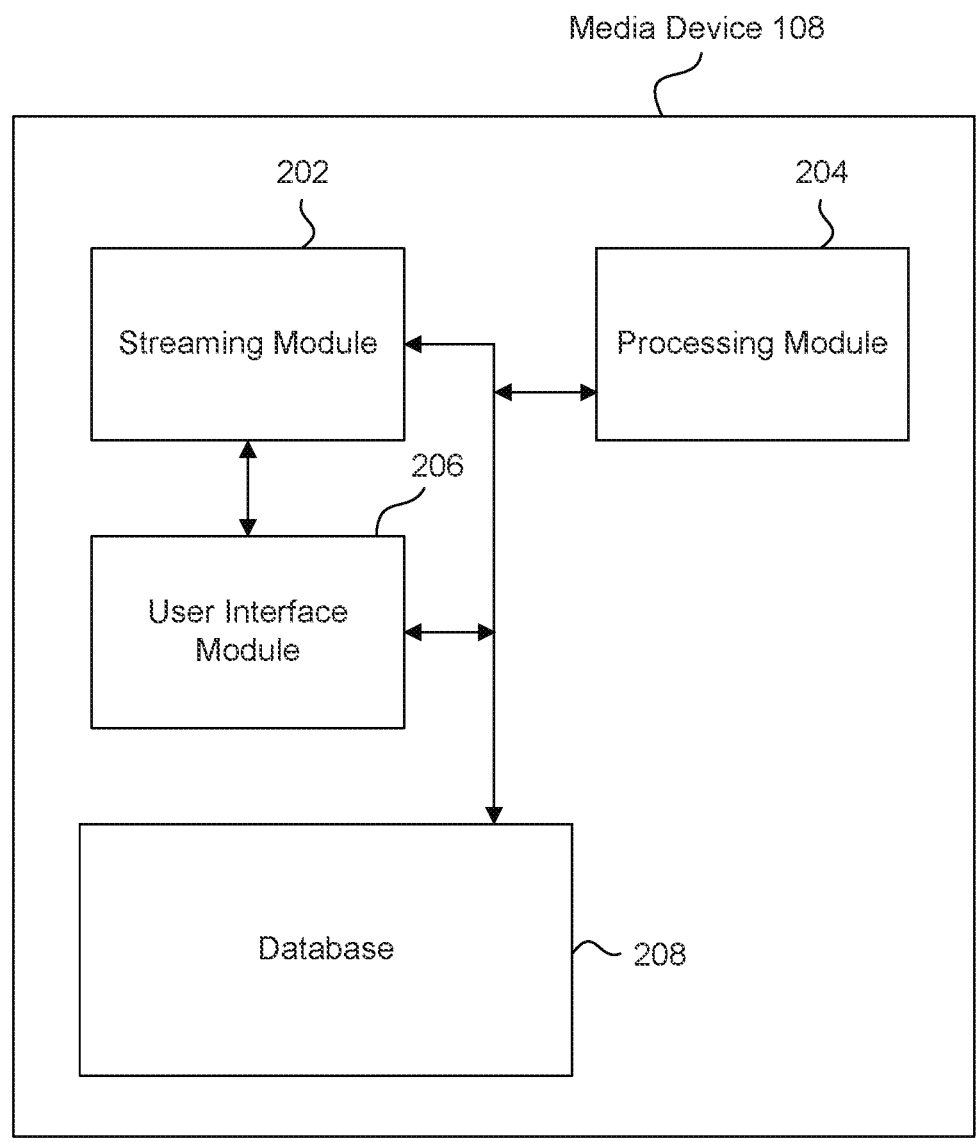
FIG. 2A illustrates a block diagram of a media device, according to some embodiments.
Figure 2B:
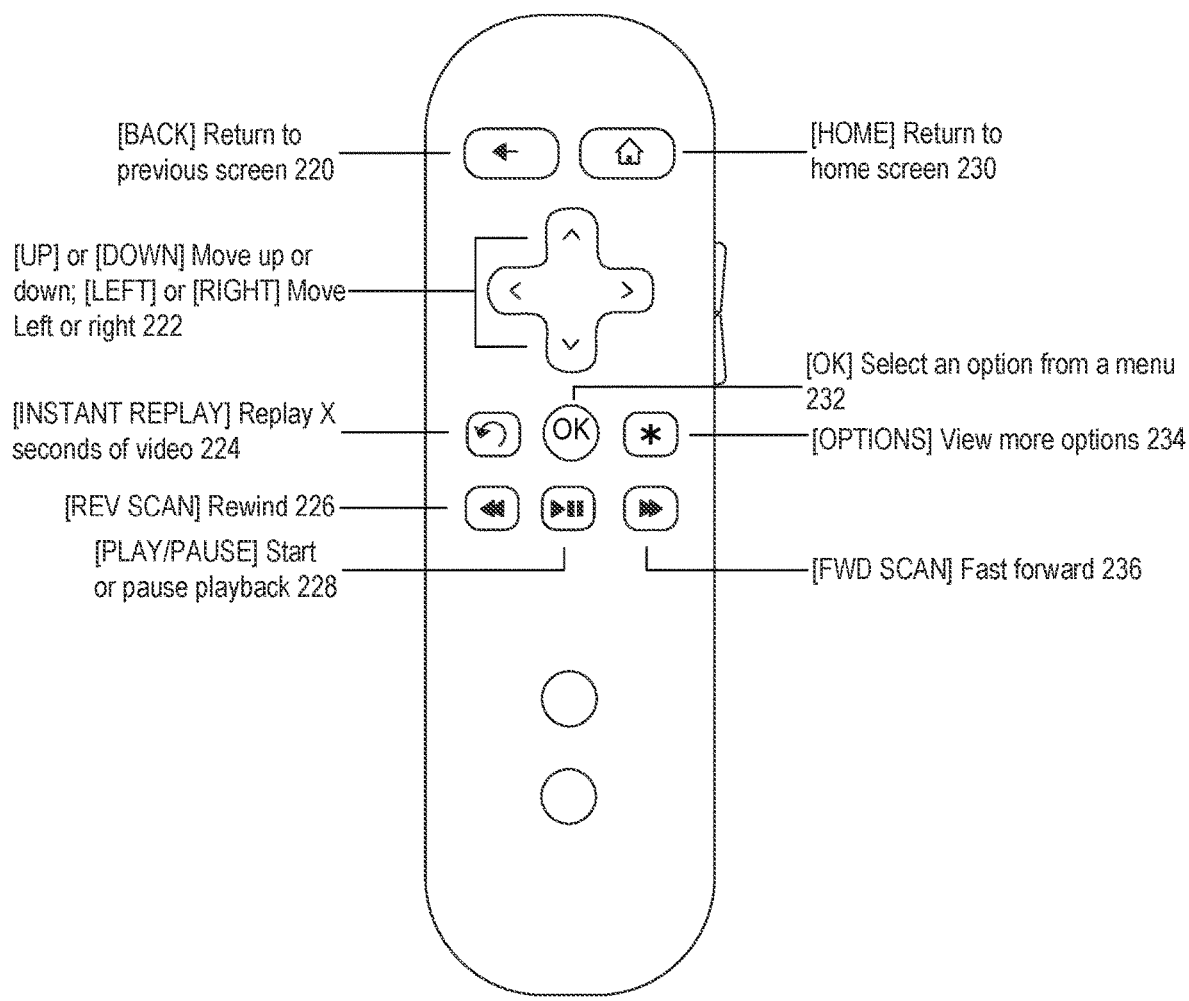
FIG. 2B illustrates a remote control for use with a media device, according to some embodiments.

FIG. 2A illustrates an example block diagram of the media device 108, according to some embodiments. Media device 108 may include a streaming module 202, processing module 204, user interface module 206 and database or storage 208.

Generally, in operation, user 112 may use remote control 110 (or, for example, voice responsive controls) to interact with the user interface module 206 of media device 108 to select content, such as a movie, TV show, music, book, application, game, etc. The streaming module 202 of media device 108 may request the selected content from content server(s) 122 over the network 120. Content server(s) 122 may transmit the requested content to the media device 108. Media device 108 may transmit the received content to display device 106 for presentation to user 112. The streaming module 202 in media device 108 may transmit the content to display device 106 in real time or near real time as it receives such content from content server(s) 122. Also or alternatively, media device 108 may buffer or store the content received from content server(s) 122 in database 208 for later playback on display device 106.

While watching a movie or TV show (or other content) on the display device 106, the user 112 may use the remote control 110 to navigate through the movie/TV show. For example, in some embodiments, the user 112 may press the [Left] or [Right] buttons 222, the rewind button 226 and/or the fast forward button 236 to display the example graphic user interface (GUI) 302 shown in FIG. 3. It should be understood that there may be other buttons (or combination of buttons) on the remote control 110 that may result in displaying the GUI 302 on the display device 106.

GUI 302 may represent a 10-foot UI when the display device 106 is a television, for example. Consider the case where the user 112 is watching a movie on the display device 106. In this case, the GUI 302 may display a video still 301 of the last frame of the movie that was being played when the user 112 invoked the GUI 302.

The GUI 302 may support thumbnail navigation for enabling the user 112 to quickly and efficiently navigate through the movie. For example, the GUI 302 may include thumbnails such as a frame in focus 305 representing a current scene change or chapter. Other thumbnails may include one or more previous scene change or chapter still frames 304, and one or more next scene change or chapter still frames 307. The user 112 can use remote control 110 to scroll through or otherwise select any of these thumbnails (that is, frames 304, 305 and 307) to quickly navigate through the movie.

Figure 3:
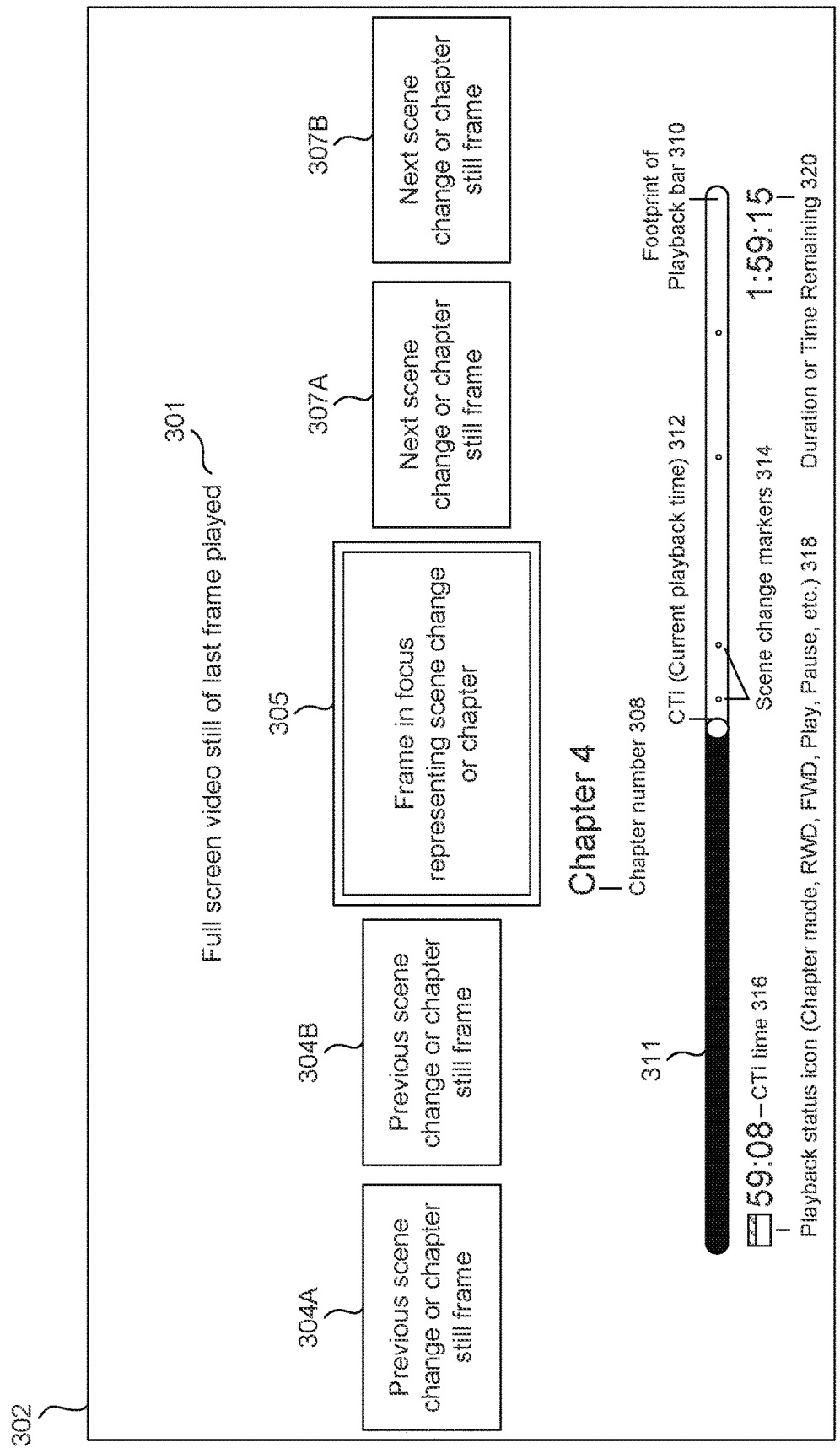
FIG. 3 illustrates an example graphical user interface for a television in a multimedia environment, according to some embodiments.

The GUI 302 may also include a playback bar 311 (element 310 represents the footprint of the playback bar 311). The playback bar 311 generally represents a timeline of the video being presented in the display device 106, and indicates the amount of the video that has been played. The right-most point of the playback bar 311 is the CTI (current playback time) 312, which in the timeline of the video corresponds to the video still 301 of the last frame played. The playback bar 311 includes scene change markers 314 that, when positioned to the right of the CTI 312 (as shown in the example of FIG. 3), correspond to the next scene change or chapter still frames 307.

The GUI 302 may include other elements representing the state of playback as feedback to the user 112. For example, the GUI 302 may indicate the CTI time 316 and the duration or time remaining 320. The GUI 302 may also include a playback status icon 318, indicating whether the video is currently in chapter mode, being rewound, fast forwarded, played, paused, stopped, etc.

Automatically And Programmatically Generating Scene Change Markers

In some embodiments, scene change markers 314 within the playback bar 311 are automatically and programmatically generated in a crowdsourced manner. Such embodiments leverage the fact that millions of people watch any given movie or TV show (or other content). These embodiments determine the level of interest of viewers through learning their interactions, so as to programmatically generate scene change markers.

By using this approach, it is possible to generate scene change markers for all the movies and TV shows (as well as other content) in an OTT provider's catalog. Also, this crowdsourced approach better ensures that the scene change markers capture the interests of viewers. While the following is described with reference to scene change markers, it should be understood that this disclosure is also applicable any other markers of interest to viewers.

Figure 4:
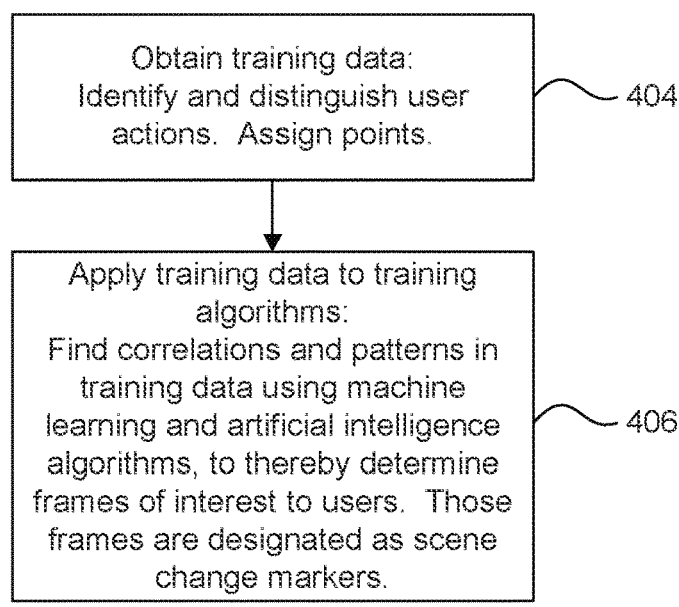
FIGS. 4 and 5 illustrate flowcharts for automatically and programmatically generating scene change markers, according to some embodiments.

FIG. 4 illustrates a method 402 for automatically and programmatically generating scene change markers in a crowdsourced manner, according to some embodiments. Method 402 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 4, as will be understood by a person of ordinary skill in the art.

Method 402 shall be described with reference to FIGS. 1 and 3. However, method 402 is not limited to those example embodiments.

In some embodiments, method 402 is directed to a learning system with two primary aspects: training data and a training algorithm. Accordingly, in step 404, training data is obtained. For example, as users 112 watch and interact with content, the media device 108 receives data on user interactions. The media device 108 identifies and distinguishes user interactions, and assigns point values to the types of interactions detected.

For example, an interaction (called "Interaction 1" for reference purposes) involving a user pausing the video for at least 10 seconds, and then resuming play without fast forwarding or rewinding, may have a point value of 1.

Another interaction (called "Interaction 2" for reference purposes) involving a user playing video for at least 10 minutes after fast forwarding or rewinding through the content a single time may have a point value of 2 points.

Still another interaction (called "Interaction 3" for reference purposes) in involving a user playing video for at least 10 minutes after fast forwarding and rewinding through the content several times may have a point value of 4 points.

As shown by the above examples, in some embodiments, interactions are assigned point values based on the degree to which they reflect the user's intent to locate a particular location in the content (such as the beginning of a particular scene in a movie or TV show, for example). In the above examples, Interaction 3 is assigned a higher point value than Interaction 2, because fast forwarding/rewinding multiple times (per Interaction 3) indicates greater user intent to locate a particular location in the video, versus fast forwarding/rewinding a single time (per interaction 2).

Similarly, pausing the video and then resuming play (per Interaction 1) may indicate some, but limited, user intent to locate a particular location in the content, so Interaction 1 is given a lower point value than either Interaction 2 or 3.

In some embodiments, each interaction has a landing frame, and the point value assigned to the interaction is associated with the landing frame. For example, for interaction 1, the landing frame is the frame in the video where the user paused before resuming play. For Interactions 2 and 3, the landing frame is the frame where the fast forwarding rewinding ended before the user resumed playing the video.

Another example interaction (called "Interaction 4" for reference purposes) may involve a user playing video for at least X minutes after fast forwarding and rewinding through the content several times. Similar to Interactions 2 and 3, the landing frame for Interaction 4 is the frame where the fast forwarding/rewinding ended before the user resumed playing the video. As will be appreciated, watching the video for 10 minutes versus 5 minutes (for example) may indicate greater user interest in the landing frame and thus merit a higher point value. Thus, the points for Interaction 4 may be a function of X, where the points increase as X increases.

In some embodiments, certain interactions may have negative points. An example interaction (called "Interaction 5" for reference purposes) may involve a user pausing the video for at least 10 seconds, and then fast forwarding or rewinding, rather than resuming play. The landing frame of Interaction 5 is the frame where the video is paused. Fast forwarding or rewinding from this frame, rather than playing, may indicate user disinterest in the landing frame. Accordingly, in some embodiments, the landing frame of Interaction 5 may be assigned a negative value, such as −1.

In some embodiments, step 404 is performed locally by media devices 108. Thus, millions of media devices 108 around the world may perform step 404 while their respective users watch a given movie or TV show (or other content), to detect user interactions associated with that movie/TV show.

These user interactions detected in step 404, and their associated point values, represent training data that is input to a training algorithm (represented by step 406, which is described below). In some embodiments, a minimum amount of training data is needed for the training algorithm to provide acceptable accuracy, typically N number of frames across M sessions. The values of N and M may be a function of the training algorithm used, and may depend on the desired accuracy of prediction. In some embodiments, the training algorithm is executed at the crowdsource server 114.

In step 406, the training algorithm makes use of the training data to find correlations and patterns in the data using machine learning and artificial intelligence (AI) algorithms. The algorithm reasons if there are many users who rewind or fast forward to play frame X, and thereafter continuously play the content, then frame X is of interest to a substantial number of users. Frame X may then be designated a crowdsourced scene change marker. Accordingly, the learning system with its training algorithm is configured to expose relevant patterns and correlations hidden in data, and reflect user behavior related to a single piece of content.

Figure 5:
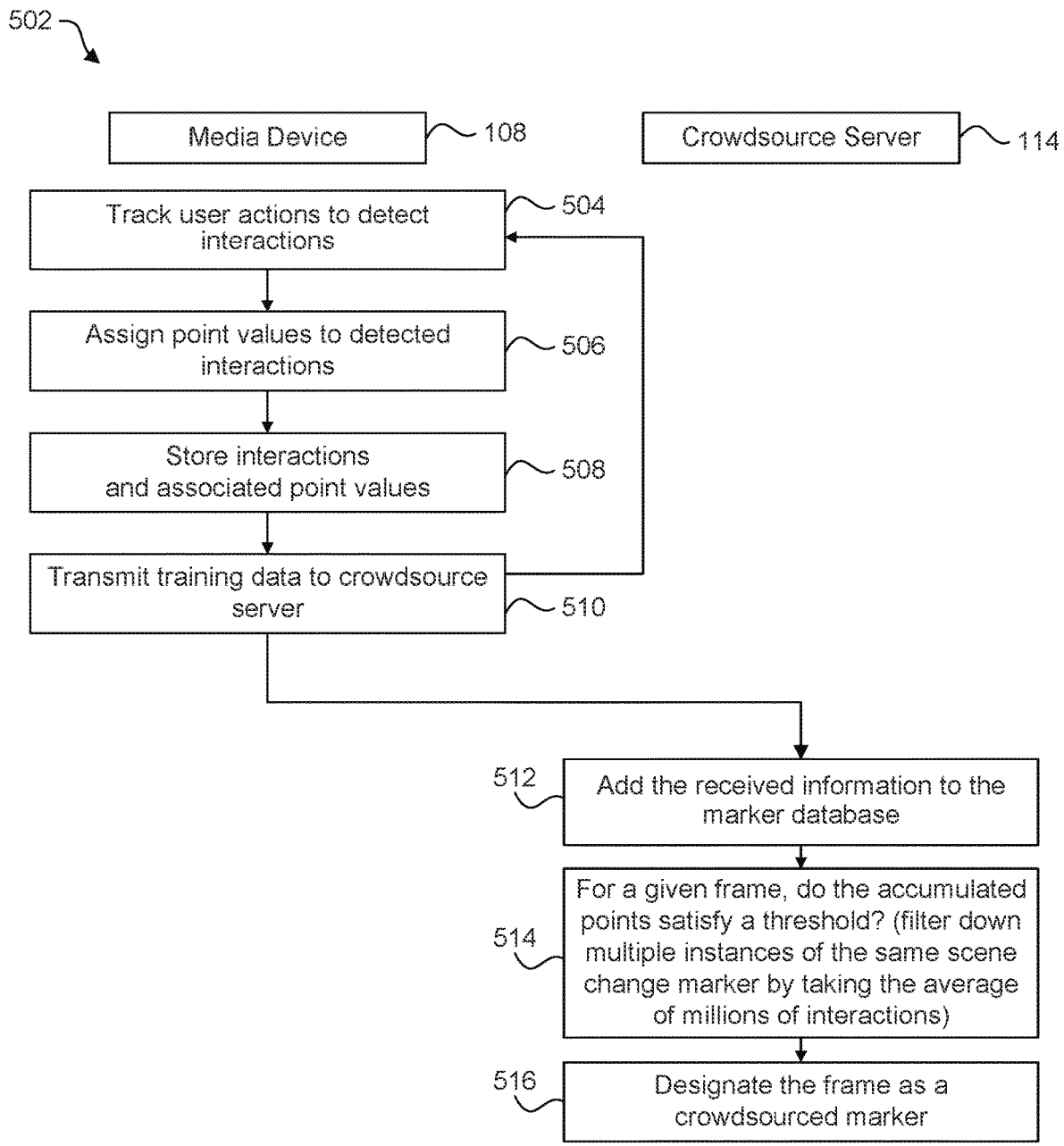

FIG. 5 illustrates a method 502 for automatically and programmatically generating scene change markers in a crowdsourced manner, according to some embodiments. Method 502 is an example implementation of method 402 in FIG. 4. However, method 402 is not limited to the example implementation of method 502.

Method 502 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 5, as will be understood by a person of ordinary skill in the art. Method 502 shall be described with reference to FIGS. 1-3. However, method 502 is not limited to those example embodiments.

In step 504, the media device 108 tracks actions of the user 112 to detect and distinguish user interactions. Examples of these user interactions are discussed above.

In step 506, the media device 108 assigns point values to the interactions detected in step 504. The point values may be fixed (such as with the example Interactions 1-3 and 5 discussed above) or variable (such as with the example Interaction 4).

In step 508, the detected interactions and assigned point values are stored in a database 208 of the media device 108. In some embodiments, the interactions and associated points are organized in the database 208 by content, and by the landing frames of the interactions. For example, interactions and point values that were obtained while viewing a particular movie are stored in records of the database 208 associated with that movie, and are ordered by the landing frames associated with those interactions.

In step 510, the media device 108 periodically transmits the detected interactions and assigned point values from the database 208 to the crowdsource server 114.

Steps 504-510 may be performed repeatedly by media device as users 112 view and navigate through content, as indicated by the control branch from step 510 to step 504. Also, millions of media devices 108 around the world may repeatedly perform steps 504-510 to detect user interactions and assign point values. This training data (that is, the detected interactions and point values) are provided to the crowdsource server 114 in step 510.

In step 512, the crowdsource server 114 stores the received interactions and associated point values in the marker database 118. In some embodiments, the interactions and associated points are organized in the marker database 118 by content, and by the landing frames of the interactions. For example, interactions and point values that were obtained while viewing a particular movie are stored in records of the marker database 118 associated with that movie, and are ordered by the landing frames associated with those interactions.

In step 514, for a given frame (called "Frame X" for reference purposes) of a movie or TV show (or other content), the crowdsource server 114 determines if the training data associated with Frame X constitutes a pattern such that Frame X should be designated as a scene change marker for the movie/TV show, using machine learning and artificial intelligence algorithms. For example, the crowdsource server 114 may add up the points of the interactions for which Frame X is the landing frame, and then determine if this accumulated point score meets or exceeds a predetermined threshold. If the accumulated point score meets or exceeds the predetermined threshold, then in step 516 the crowdsource server 114 designates Frame X as a crowdsourced scene change marker (also called a "crowdsourced marker" herein).

In some embodiments, to reduce noise and the number of crowdsourced markers, the crowdsource server 114 in step 514 takes into consideration a window having a plurality of frames when calculating the accumulated point score for Frame X. More specifically, in some embodiments, the crowdsource server 114 may average N amount of interactions related to the same scene change for a specific point in time within the movie or TV show to output a single frame that faithfully represents the scene change. The window (for example, the value of N) may be or represent a length of time that constitutes a typical scene change. Thus, the window may be 3 seconds, although this disclosure is not limited to that example. In some embodiments, the frame being considered—that is, Frame X in the above example—is positioned at the center of the window. Accordingly, in step 514, the crowdsource server 114 adds up the points of the interactions for which the frames in the window are the landing frames. Then, in step 516, the crowdsource server 114 designates Frame X as a crowdsourced marker if the accumulated point score for the window of frames meets or exceeds the predetermined threshold.

The crowdsource server 114 may repeat steps 514 and 516 for each frame of each movie or TV show (or other content) represented in the training data stored in the marker database 118. In this way, the crowdsource server 114 automatically and programmatically generates scene change markers in a crowdsourced manner, and such crowdsourced markers (shown as scene change markers 314 in the playback bar 311 of FIG. 3) enable quick and easy navigation through movies and TV shows (as well as other content).

Figure 8:
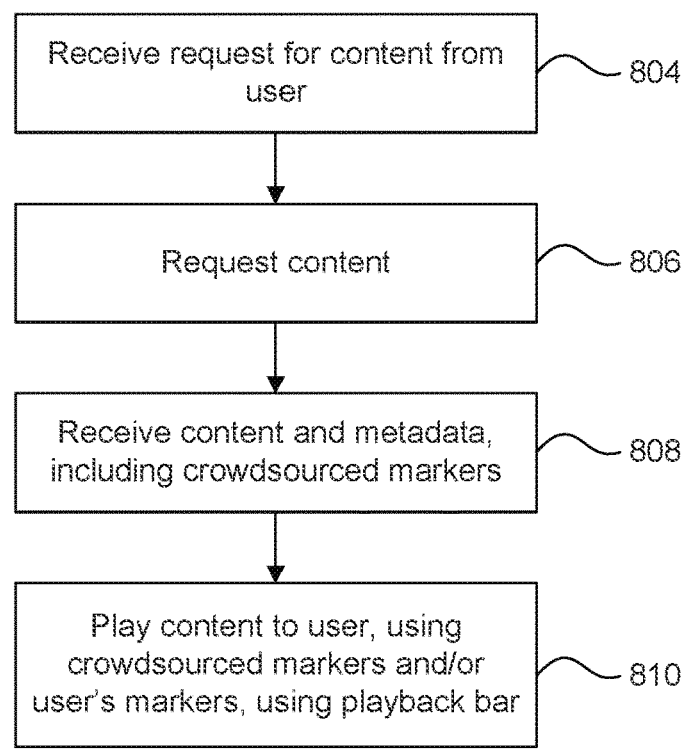
FIG. 8 illustrates a flowchart of a method for presenting content (such as a movie or TV show) to a user using an enhanced playback bar, wherein the content includes crowdsourced markers, according to some embodiments.

FIG. 8 illustrates a method 802 for providing a movie (or other content) to a user 112, wherein the movie includes crowdsourced markers, according to some embodiments.

In step 804, media device 108 receives a request for a movie from user 112.

In step 806, media device 108 requests the movie from the content server 122.

In step 808, media device 108 receives the movie from the content server 122. Media device 108 also receives metadata 126 corresponding to the movie. The metadata 126 may include crowdsourced markers generated as described herein.

In step 810, media device 108 plays the movie to the user 112 on display device 106. As described above, the user 112 may navigate through the movie using GUI 302, GUI 302. includes the playback bar 311. The playback bar 311 includes scene change markers 314, some or all of which may be crowdsourced markers.

Automatically And Programmatically Generating Crowdsourced Trailers

In some embodiments, the crowdsourced markers discussed above may be used to automatically and programmatically generate content trailers (also sometimes called previews herein). The trailers may be used to preview content for users, for example. Because trailers comprise moving images, they are often more useful to users when deciding whether a given movie or TV show (or other content) is of interest, compared to static images.

Figure 10:
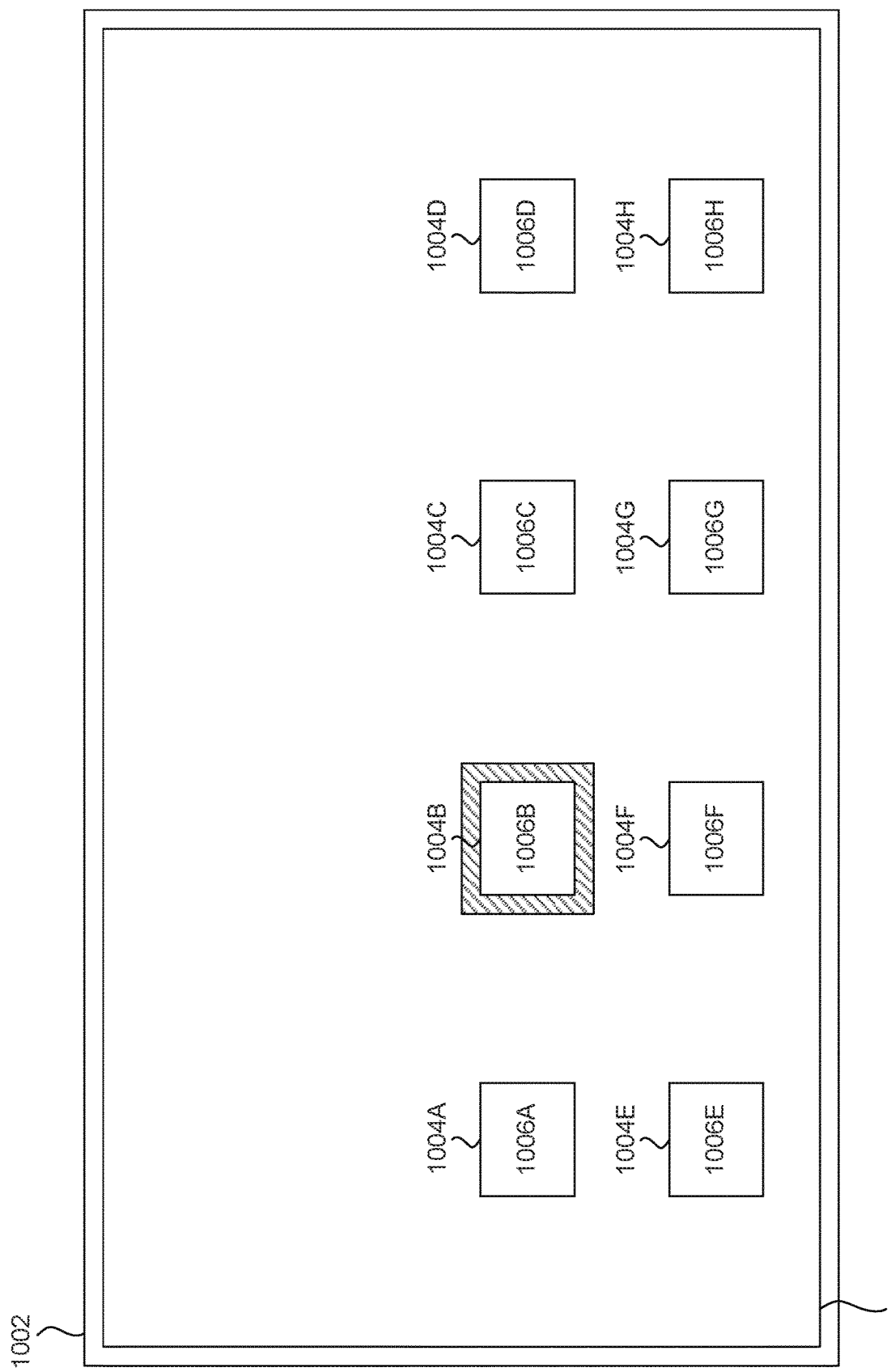
FIGS. 10 and 11 are example user interfaces for enabling users to select content for display, according to some embodiments.

FIG. 10 illustrates an example GUI 1002 for display on the display device 106, according to some embodiments. GUI 1002 may represent a 10-foot UI when the display device 106 is a television, for example.

The GUI 1002 may include a plurality of tiles 1004. Each tile 1004 represents a movie or TV show (or other content) available for display on the display device 106 from content servers 122. While 8 tiles 1004 are shown in the example of FIG. 10, in practice the GUI 1002 may include any number of tiles 1004.

In some embodiments, each tile 1004 includes a static image 1006. The static images 1006 are representative of the content respectively associated with the tiles 1004. For example, some static images 1006 may be an image from the movie or TV show, and/or include a name or logo associated with the movie or TV show. Because the static images 1006 are static, they provide only limited information about the associated content. As such, static images 1006 provide users with only limited assistance when they are trying to identify content of interest.

Figure 11:
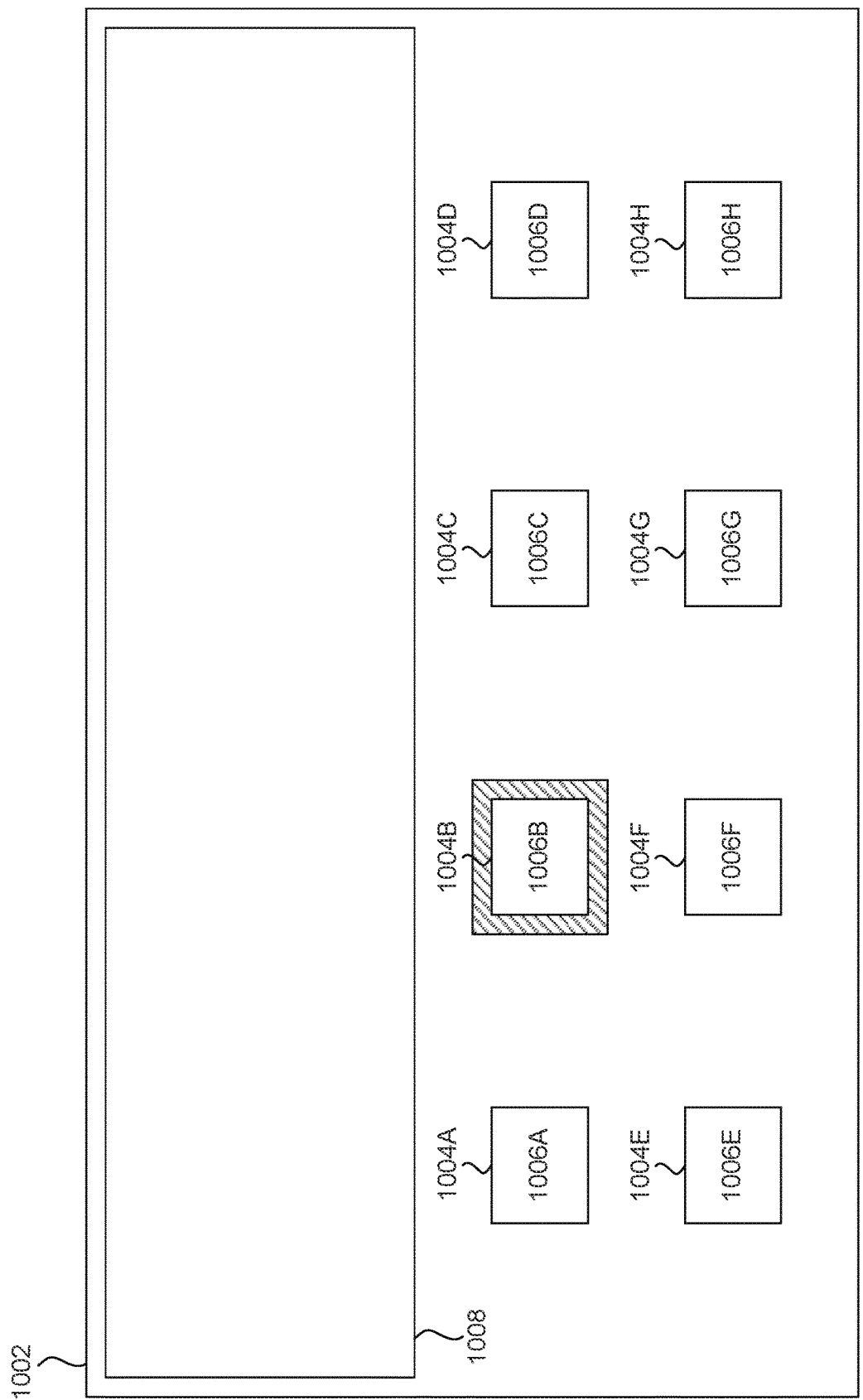

In some embodiments, GUI 1002 also includes a preview display area 1008. In the example of FIG. 10, the preview display area 1008 comprises most (and in some embodiments, all) of the space of GUI 1002, such that the tiles 1004 are on top of the preview display area 1008. In other embodiments, as shown in the example of FIG. 11, the preview display area 1008 comprises an area in the GUI 1002 that does not overlap with the tiles 1004, such as being above the tiles 1004. The preview display area 1008 is not limited to the examples shown in FIGS. 10 and 11. For example, the preview display area 1008 may include only a portion of the space shown in either FIG. 10 or FIG. 11. Also or alternatively, the GUI 1002 may include more than one preview display area 1008. Also or alternatively, each tile 1004 (or one or more of tiles 1004) may include a preview display area 1008.

In the examples of FIGS. 10 and 11, tile 1004B has been selected by the user 112. Selection of tile 1004B is indicated by the cross-hatched border, although the selection may be indicated in other ways, such as via different fonts, colors, illumination, etc. The user 112 may have selected tile 1004B using remote control 110 or any other methodology, such as but not limited to voice command.

In some embodiments, a trailer corresponding to the selected tile 1004B is displayed in the preview display area 1008. The trailer may be used to preview the content associated with the selected tile 1004B to the user 112. Because the trailer comprises moving images, it is often more useful to the user 112 when deciding whether the content associated with the selected tile 1004B is of interest, compared to using static images to preview the content.

Figure 12:
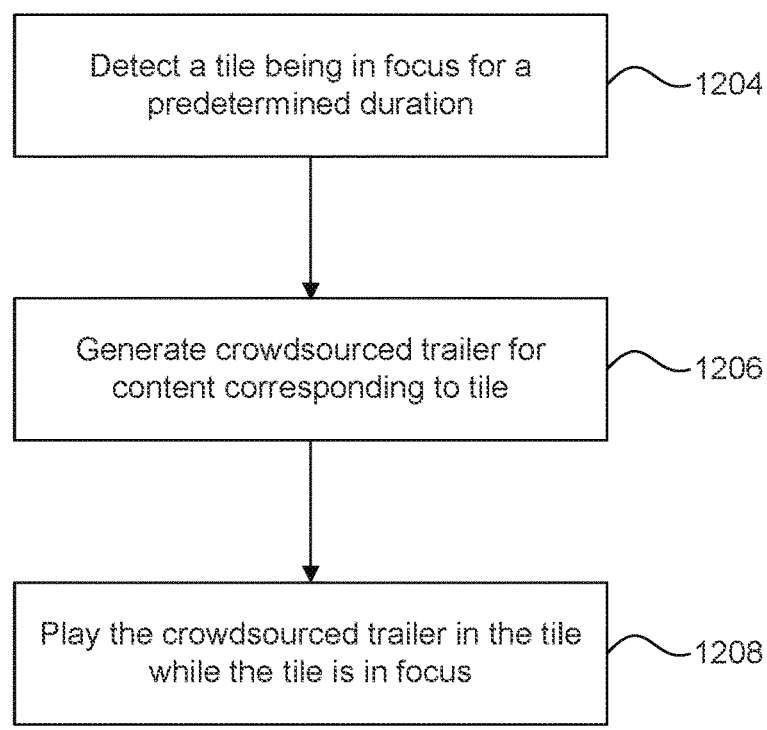
FIG. 12 is a flowchart for displaying crowdsourced trailers (or previews) in, for example, the user interfaces of FIGS. 10 and 11, according to some embodiments.

The operation just described is represented by a flowchart of a method 1202 shown in FIG. 12. Method 1202 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 12, as will be understood by a person of ordinary skill in the art. Method 1202 shall be described with reference to FIGS. 1, 10 and 11. However, method 1202 is not limited to those example embodiments.

In step 1204, media device 108 may detect that the user 112 has selected (that is, focused on) one of the tiles 1004 in GUI 1002. Assume, for purposes of example and not limitation, that the media device 108 detects that the user 112 has focused on tile 1004B. The media device 108 may detect such operation by determining that the user 112 used the remote control 110 to focus on the tile 1004B for a predetermined amount of time. In another example, the media device 108 may receive a command from the user 112 (via the remote control 110 or voice command, for example) for the selection of tile 1004B.

In step 1206, a trailer corresponding to content of the selected tile 1004 may be generated. In some embodiments, the trailer may be automatically and programmatically generated in a crowdsourced manner. Step 1206 is described further below with reference to FIG. 13.

In step 1208, the media device 106 may display the trailer in the preview display area 1008 of the GUI 1002, while the corresponding tile 1004 is in focus. As discussed above, the preview display area 1008 may comprise most of the space of GUI 1002 (as shown in FIG. 10), or just part of the space of the GUI 1002 that does not overlap with the tiles 1004 (as shown in FIG. 11), or any other configuration. For example, and without limitation, where the preview display area 1008 is within tiles 1004, the trailer may be displayed within the selected tile 1004B.

Figure 13:
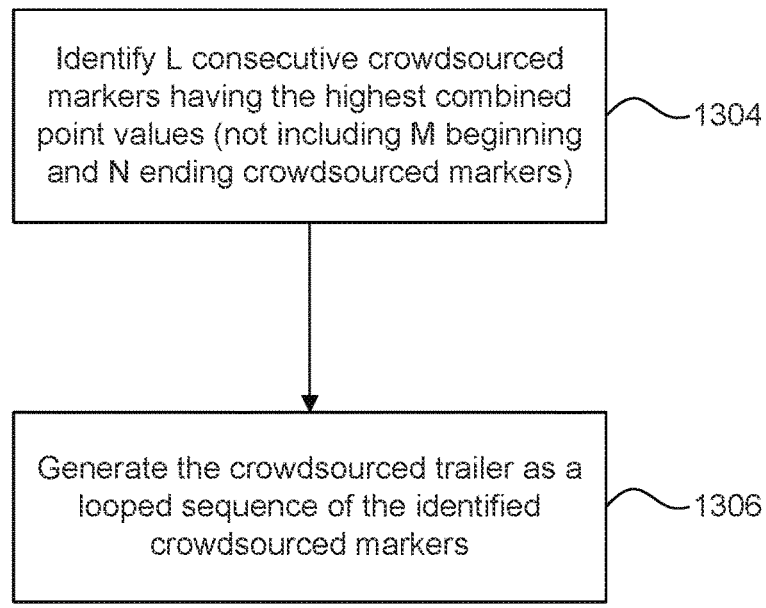
FIG. 13 is a flowchart for generating trailers (or previews) in a crowdsourced manner, according to some embodiments.

FIG. 13 illustrates a flowchart of a method 1302 for automatically and programmatically generating trailers in a crowdsourced manner, according to some embodiments. Method 1302 represents the operation of step 1206, in some embodiments. Method 1302 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 13, as will be understood by a person of ordinary skill in the art. Method 1302 shall be described with reference to FIGS. 1, 6, 7, 10 and 11. However, method 1302 is not limited to those example embodiments.

The steps of method 1302 may be performed by media device 108 and/or other devices in environment 102, such as crowdsource server(s) 114, content server(s) 122, etc.

In embodiments, the content associated with the selected tile 1004B comprises a plurality of crowdsourced markers. Embodiments for generating the crowdsourced markers were discussed above. For illustrative purposes, in the following discussion of method 1302, "crowdsourced markers" refer to the crowdsourced markers in the content associated with the selected tile 1004B.

In step 1304, L consecutive crowdsourced markers having the highest combined point values may be identified (such accumulated point values/scores were discussed above with reference to, for example, FIG. 5). In some embodiments, the first M crowdsourced markers and the last N crowdsourced markers in the content associated with the selected tile 1004B are not included in the operation of step 1304. This is to eliminate the possibility of accidentally adding title and credits that are usually found at the beginning and at the end of content. In some embodiments, L is equal to 5 or 6, and both M and N are equal to 3. However, this disclosure is not limited to this example, and L, M and N can be any other integer values.

Figure 6:
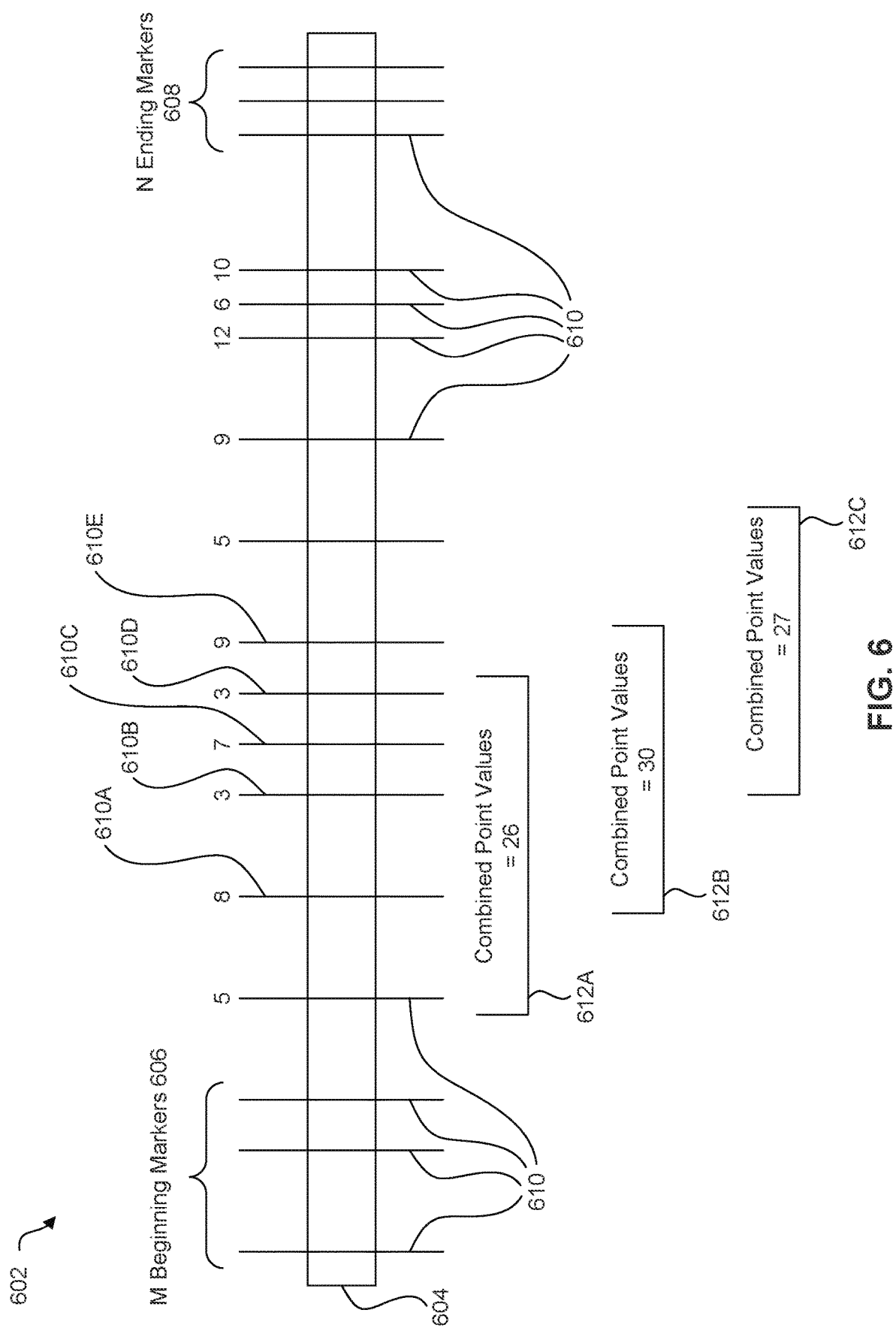
FIG. 6 illustrates an example for generating trailers (or previews) in a crowdsourced manner, according to some embodiments.

The operation of step 1304 shall be described with respect to an example timeline 604 of a movie 602 shown in FIG. 6. In this example, the movie 602 is the content corresponding to the selected tile 1004B (that is, the tile currently in focus). Movie 602 has a number of crowdsourced markers 610. The first M markers 610 are shown as 606 (where M is equal to 3 in this example), and the last N markers 610 are shown as 608 (where N is also equal to 3 in this example).

In the example of FIG. 6, L is equal to 5. Accordingly, in step 1304, a window 612 of length L moves over the timeline 604 starting after the beginning markers 606 and ending just before the ending markers 608. Each marker 610 has an accumulated crowdsourced point value (as described above with respect to FIG. 5). The combined point values for the L markers 610 in each window 612 are summed. The first 3 windows 612A-612C and their combined point values are shown in the example of FIG. 6. Pursuant to step 1304, the consecutive crowdsourced markers 610 having the highest combined point values are identified in this manner.

In step 1306, a trailer for the content associated with the selected tile 1004B may be generated using the crowdsourced markers 610 identified in step 1304. For example, in 1306, segments of the movie 602 may be concatenated together, where the segments begin in the movie 602 at the identified crowdsourced markers 610, and where the order of the segments in the trailer correspond to the order of the identified crowdsourced markers 610 in the movie 602.

Figure 7:
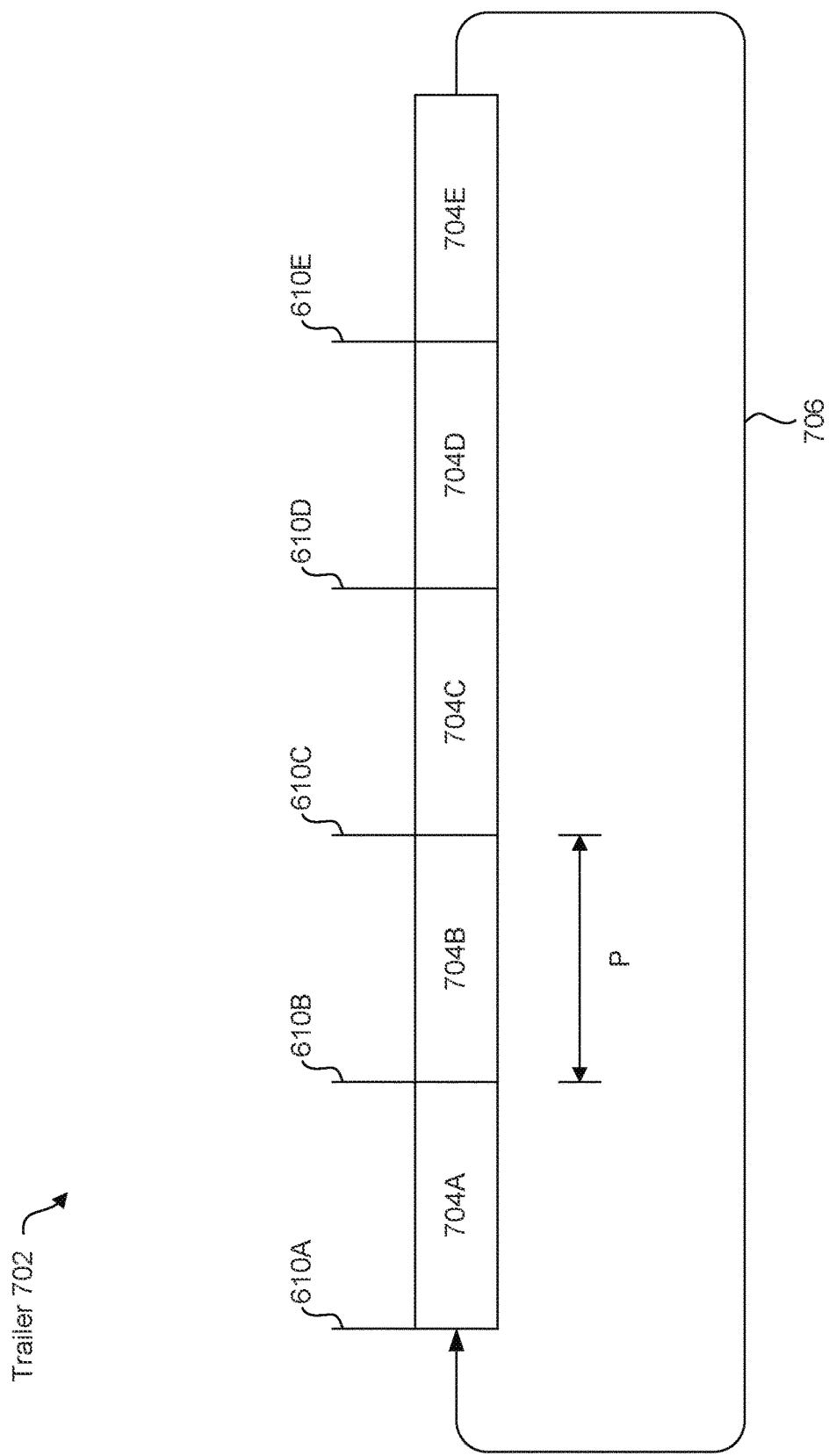
FIG. 7 illustrates an example trailer that has been programmatically generated in a crowdsourced manner.

FIG. 7 illustrates an example trailer 702 generated according to step 1306, according to some embodiments. For the example in FIG. 7, it is assumed that the crowdsourced markers 610A-610E in window 612B had the highest combined point values as determined in step 1304. Thus, in this example, trailer 702 is generated in step 1306, where trailer 702 has video segments 704 corresponding to portions of the movie 602 that begin at the identified crowdsourced markers 610A-610E. In some embodiments, each video segment 704 is of length P. P may be 5 seconds, such that the length of the trailer 702 is 25 seconds (it is noted that may be values different than 5 seconds). In some embodiments, trailer 702 may be looped, as indicated by 706. In some embodiments, trailer 702 includes only video and does not include audio.

Because markers 610 were generated programmatically in a crowdsourced manner (as described above), the trailers 702 resulting from method 1302 of FIG. 13 also were generated programmatically in a crowdsourced manner.

It is noted that the trailer 702 for any particular movie 602 (or other content) may change over time, as the point values for markers 610 change (as described above with reference to FIG. 5).

In some embodiments, the crowdsource markers 610 associated with the trailer 702 for a particular movie (or other content), such as markers 610A-610E in the example trailer 702 of FIG. 7, may be identified by crowdsource server 114 and stored in database 117 before operation of flowchart 1202 in FIG. 12. In fact, in some embodiments, the crowdsource markers 610 associated with the trailer 702 for the content corresponding to some or all of the tiles 1006 in GUI 1002 (as well as other content) may be identified by crowdsource server 114 and stored in database 117 before operation of flowchart 1202. In some embodiments, in addition or alternatively to displaying the trailer for the selected tile 1004B in the preview display area 1008, the crowdsourced trailers for some or all of the tiles 1004 in the GUI 1002 may be played in the tiles 1004 themselves (rather than having static images in the tiles 1004).

In some embodiments, trailers 702 for movies and other content are not generated in advance, prior to their use in step 1208. Rather, trailers 702 may be generated in real time and upon demand in step 1206, by using the identified crowdsourced markers 610 as pointers into the content, as described above. Also, only the crowdsourced markers 610 corresponding to a given trailer 702 need be stored in database 117, and not the video segments 704 constituting the trailer 702. And, crowdsourced markers 610 are small in size compared to video segments 704. Accordingly, embodiments of this disclosure reduce the amount of computer storage needed to perform the functions described herein, and thus represent an improvement of computer technology.

Example Computer System

Figure 9:
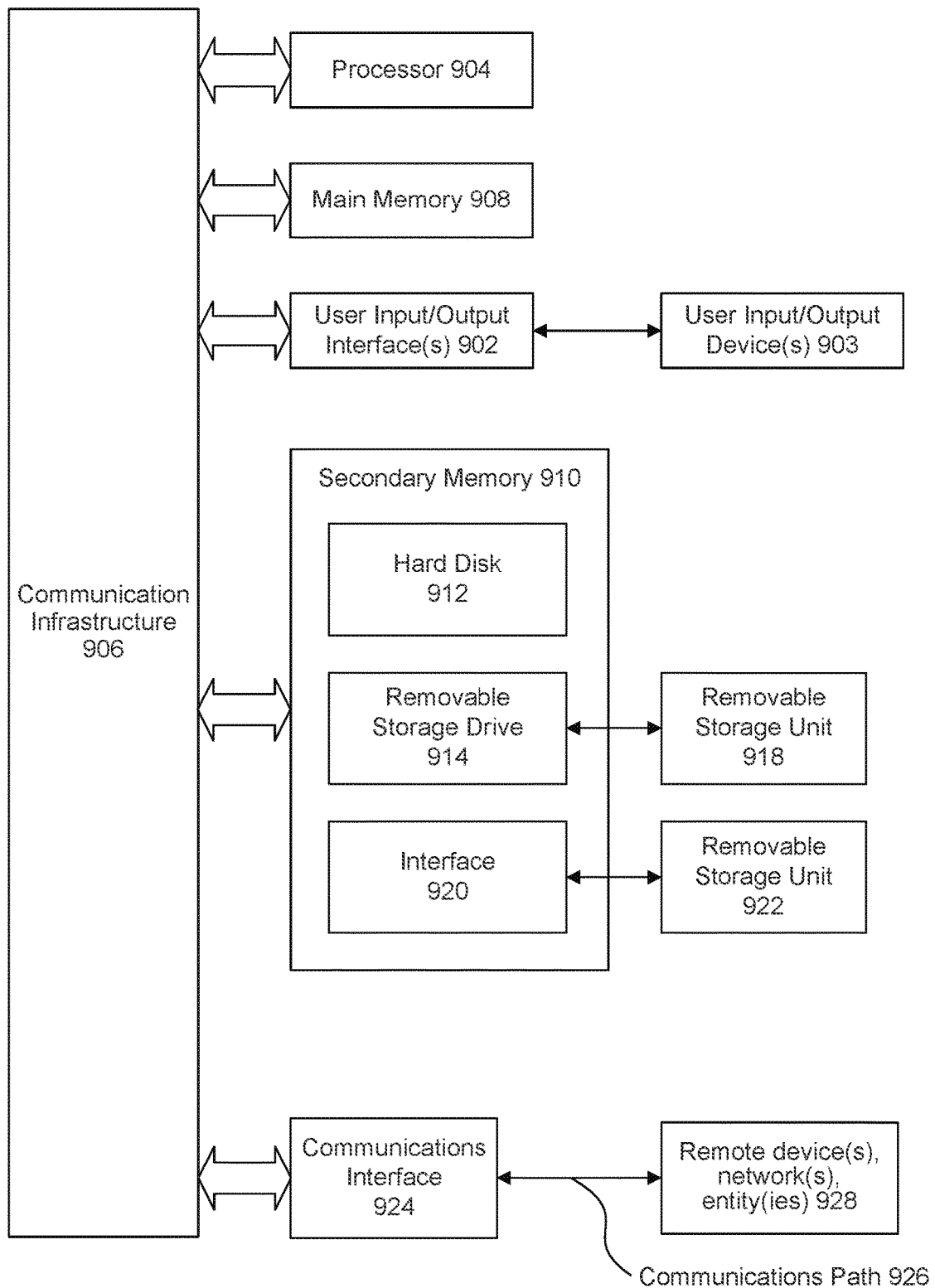
FIG. 9 illustrates an example computer system useful for implementing various embodiments.

Various embodiments and/or components therein can be implemented, for example, using one or more computer systems, such as computer system 900 shown in FIG. 9. Computer system 900 can be any computer or computing device capable of performing the functions described herein. For example, one or more computer systems 900 can be used to implement any embodiments described herein, and/or any combination or sub-combination thereof.

Computer system 900 includes one or more processors (also called central processing units, or CPUs), such as a processor 904. Processor 904 is connected to a communication infrastructure or bus 906.

One or more processors 904 can each be a graphics processing unit (GPU). In some embodiments, a GPU is a processor that is a specialized electronic circuit designed to process mathematically intensive applications. The GPU can have a parallel structure that is efficient for parallel processing of large blocks of data, such as mathematically intensive data common to computer graphics applications, images, videos, etc.

Computer system 900 also includes user input/output device(s) 903, such as monitors, keyboards, pointing devices, etc., that communicate with communication infrastructure 906 through user input/output interface(s) 902.

Computer system 900 also includes a main or primary memory 908, such as random access memory (RAM). Main memory 908 can include one or more levels of cache. Main memory 908 has stored therein control logic (i.e., computer software) and/or data.

Computer system 900 can also include one or more secondary storage devices or memory 910. Secondary memory 910 can include, for example, a hard disk drive 912 and/or a removable storage device or drive 914. Removable storage drive 914 can be a floppy disk drive, a magnetic tape drive, a compact disk drive, an optical storage device, tape backup device, and/or any other storage device/drive.

Removable storage drive 914 can interact with a removable storage unit 918. Removable storage unit 918 includes a computer usable or readable storage device having stored thereon computer software (control logic) and/or data. Removable storage unit 918 can be a floppy disk, magnetic tape, compact disk, DVD, optical storage disk, and/any other computer data storage device. Removable storage drive 914 reads from and/or writes to removable storage unit 918 in a well-known manner.

According to an exemplary embodiment, secondary memory 910 can include other means, instrumentalities or other approaches for allowing computer programs and/or other instructions and/or data to be accessed by computer system 900. Such means, instrumentalities or other approaches can include, for example, a removable storage unit 922 and an interface 920. Examples of the removable storage unit 922 and the interface 920 can include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 900 can further include a communication or network interface 924. Communication interface 924 enables computer system 900 to communicate and interact with any combination of remote devices, remote networks, remote entities, etc. (individually and collectively referenced by reference number 928). For example, communication interface 924 can allow computer system 900 to communicate with remote devices 928 over communications path 926, which can be wired and/or wireless, and which can include any combination of LANs, WANs, the Internet, etc. Control logic and/or data can be transmitted to and from computer system 900 via communication path 926.

In some embodiments, a tangible, non-transitory apparatus or article of manufacture comprising a tangible, non-transitory computer useable or readable medium having control logic (software) stored thereon is also referred to herein as a computer program product or program storage device. This includes, but is not limited to, computer system 900, main memory 908, secondary memory 910, and removable storage units 918 and 922, as well as tangible, non-transitory articles of manufacture embodying any combination of the foregoing. Such control logic, when executed by one or more data processing devices (such as computer system 900), causes such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 9. In particular, embodiments can operate with software, hardware, and/or operating system implementations other than those described herein.

CONCLUSION

It is to be appreciated that the Detailed Description section, and not the Summary and Abstract sections, is intended to be used to interpret the claims. The Summary and Abstract sections can set forth one or more but not all exemplary embodiments as contemplated by the inventors, and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A method comprising:
receiving interactions with streaming content performed by a plurality of users who consumed the streaming content, wherein the interactions are associated with a landing frame of the streaming content;
assigning a value to each of the interactions, wherein the assigned value corresponds to a number of times either a fast forward or rewind command is received, wherein a greater number of times corresponds to a higher assigned value, wherein a first interaction of the interactions comprises at least one fast forward interaction and at least one rewind interaction prior to a play command combined into the first interaction;

identifying a plurality of windows of content within the streaming content, wherein each window comprises a plurality of frames, including the landing frame;

accumulating the assigned values of the interactions for the landing frame within each of the plurality of windows;

selecting a particular window of the plurality of windows with a highest accumulated value for the landing frame of the particular window;

generating a trailer for the streaming content based on the selected particular window;

providing the streaming content and the trailer;

determining that the assigned value has changed for one or more of the interactions; and updating the trailer based on the assigned value for each of the interactions, including the changed assigned value for the one or more interactions.

2. The method of claim 1, further comprising:
storing the interactions and assigned values in a marker database.

3. The method of claim 2, further comprising:
ordering the interactions based on which landing frames of the streaming content are associated with the interactions.

4. The method of claim 1, wherein the streaming content comprises music.

5. The method of claim 1, wherein the receiving comprises:
identifying at least one of the interactions that is associated with a single one of the landing frames and no other frames of the streaming content; and
excluding the identified at least one interaction from the accumulating.

6. The method of claim 1, wherein the accumulating comprises averaging the values.

7. The method of claim 1, wherein the generating comprises:
determining a number of frames of the trailer; and
arranging the landing frame associated with a selected interaction in a middle of the determined number of frames of the trailer, wherein a number of frames prior to the landing frame is equal to a number of frames following the landing frame in the trailer.

8. The method of claim 1, wherein at least one of the landing frames is used in at least two of the plurality of windows, and wherein at least one of the plurality of windows includes two or more landing frames.

9. The method of claim 1, wherein the particular interaction comprises one of a fast-forward or rewind interaction that occurred prior to a post-interaction play time.

10. The method of claim 1, wherein the updated trailer is different from the trailer generated before the updating.

11. The method of claim 1, wherein the first interaction is assigned a higher point value than an interaction comprising either a single fast forward interaction or a single rewind interaction prior to a play command.

12. A system comprising:
at least one processor configured to perform operations comprising:
receiving interactions with streaming content performed by a plurality of users who consumed the streaming content, wherein the interactions are associated with a landing frame of the streaming content;
assigning a value to each of the interactions, wherein the assigned value corresponds to a number of times either a fast forward or rewind command is received, wherein a greater number of times corresponds to a higher assigned value, wherein a first interaction of the interactions comprises at least one fast forward interaction and at least one rewind interaction prior to a play command combined into the first interaction;

identifying a plurality of windows of content within the streaming content, wherein each window comprises a plurality of frames, including the landing frame;

accumulating the assigned values of the interactions for the landing frame within each of the plurality of windows;

selecting a particular window of the plurality of windows with the highest accumulated value for the landing frame of the particular window;

generating a trailer for the streaming content based on the selected particular window;

determining that the assigned value has changed for one or more of the interactions; and updating the trailer based on the assigned value for each of the interactions, including the changed assigned value for the one or more interactions.

13. The system of claim 12, the operations further comprising:
storing the interactions and assigned values in a marker database.

14. The system of claim 13, the operations further comprising:
ordering the interactions based on which landing frames of the streaming content are associated with the interactions.

15. The system of claim 13, wherein the streaming content comprises music.

16. The system of claim 13, wherein the receiving comprises:
identifying at least one of the interactions that is associated with a single one of the landing frames and no other frames of the streaming content; and
excluding the identified at least one interaction from the accumulating.

17. The system of claim 13, wherein the accumulating comprises averaging the values.

18. The system of claim 13, wherein the generating comprises:
determining a number of frames of the trailer; and
arranging the landing frame associated with a selected interaction in a middle of the determined number of frames of the trailer, wherein a number of frames prior to the landing frame is equal to a number of frames following the landing frame in the trailer.

19. A non-transitory computer-readable medium having instructions stored thereon that, when executed by at least one computing device, cause the at least one computing device to perform operations comprising:
receiving interactions with streaming content, performed by a plurality of users who consumed the streaming content, received from remote controls communicatively coupled to streaming players that are configured to provide the streaming content, wherein each interaction corresponds to one of a button press or voice command issued via one of the remote controls, and wherein the interactions are associated with a landing frame of the streaming content;
assigning a value to each of the interactions, wherein the assigned value corresponds to a number of times either a fast forward or rewind command is received, wherein a greater number of times corresponds to a higher assigned value, wherein a first interaction of the interactions comprises at least one fast forward interaction and at least one rewind interaction prior to a play command combined into the first interaction;

identifying a plurality of windows of content within the streaming content, wherein each window comprises a plurality of frames, including the landing frame;

accumulating the assigned values of the interactions for the landing frame within each of the plurality of windows;

selecting a particular window of the plurality of windows with a highest accumulated value for the landing frame of the particular window;

generating a trailer for the streaming content based on the selected particular window;

providing the streaming content and the trailer;

determining that the assigned value has changed for one or more of the interactions; and updating the trailer based on the assigned value for each of the interactions, including the changed assigned value for the one or more interactions.

20. The non-transitory computer-readable medium of claim 19, wherein the receiving comprises:

identifying at least one of the interactions that is associated with a single one of the landing frames and no other frames of the streaming content; and excluding the at least one identified interaction from the accumulating.

* * * * *

UNITED STATES PATENT AND TRADEMARK OFFICE
CERTIFICATE OF CORRECTION

PATENT NO. : 11,838,604 B2
APPLICATION NO. : 17/730454
DATED : December 5, 2023
INVENTOR(S) : Tegethoff et al.

It is certified that error appears in the above-identified patent and that said Letters Patent is hereby corrected as shown below:

In the Specification

In Column 6, Line 17, delete "1." and insert -- 1 point. --, therefor.

In Column 10, Line 42, delete "106" and insert -- 108 --, therefor.

In Column 11, Line 42, before "consecutive", insert -- L --.

In Column 11, Line 62, after "that", insert -- P --.

Signed and Sealed this
Thirteenth Day of February, 2024

*Katherine Kelly Vidal*

Katherine Kelly Vidal
*Director of the United States Patent and Trademark Office*